(12) United States Patent
Goldberg

(10) Patent No.: US 10,952,537 B2
(45) Date of Patent: Mar. 23, 2021

(54) STEP STOOL WITH ANTI-MICROBIAL PROTECTION

(71) Applicant: BATRIK Medical Manufacturing Inc., Dorval (CA)

(72) Inventor: Mitchell K. Goldberg, Westmount (CA)

(73) Assignee: THE GOLD KIDS TRUST, Dorval (CA)

( * ) Notice: Subject to any disclaimer, the term of this patent is extended or adjusted under 35 U.S.C. 154(b) by 49 days.

(21) Appl. No.: 15/915,478

(22) Filed: Mar. 8, 2018

(65) Prior Publication Data

US 2018/0255935 A1  Sep. 13, 2018

Related U.S. Application Data

(60) Provisional application No. 62/468,995, filed on Mar. 9, 2017.

(30) Foreign Application Priority Data

Mar. 9, 2017 (CA) .................................. CA 2960350

(51) Int. Cl.
```
A47C 12/00      (2006.01)
C09D 167/00     (2006.01)
C09D 5/03       (2006.01)
C09D 5/14       (2006.01)
A47C 31/00      (2006.01)
```
(52) U.S. Cl.
CPC ............ *A47C 12/00* (2013.01); *A47C 31/007* (2013.01); *C09D 5/033* (2013.01); *C09D 5/14* (2013.01); *C09D 167/00* (2013.01)

(58) Field of Classification Search
CPC ....... A47C 12/00; A47C 31/007; A47C 13/00; C09D 5/033; C09D 5/14; C09D 167/00
See application file for complete search history.

(56) References Cited

U.S. PATENT DOCUMENTS

| | | | | | |
|---|---|---|---|---|---|
| 3,559,761 | A | * | 2/1971 | Wehner | E06C 1/005 182/15 |
| 3,614,157 | A | * | 10/1971 | Hendrickson | A47C 1/124 297/248 |
| 4,034,829 | A | * | 7/1977 | Hoffman | E06C 1/24 182/106 |
| 4,400,031 | A | * | 8/1983 | Dedecker | A47C 3/04 108/91 |
| D271,256 | S | * | 11/1983 | McClelland | D6/349 |
| 4,968,091 | A | * | 11/1990 | Mariol | A47C 12/02 297/3 |
| 4,978,168 | A | * | 12/1990 | Piretti | A47C 1/124 108/64 |
| D335,966 | S | * | 6/1993 | Schwartzkopf | D6/349 |
| 5,282,669 | A | * | 2/1994 | Barile | A47C 3/04 297/248 |
| D347,527 | S | * | 6/1994 | Breen | D6/336 |
| D357,361 | S | * | 4/1995 | Karten | D6/349 |
| D375,638 | S | * | 11/1996 | Dhanapal | D6/335 |

(Continued)

*Primary Examiner* — Katherine W Mitchell
*Assistant Examiner* — Shiref M Mekhaeil
(74) *Attorney, Agent, or Firm* — BCF, LLP

(57) ABSTRACT

The present technology generally relates to a step stool having anti-microbial protection. In particular, the present technology relates to a step stool having an anti-microbial coating.

15 Claims, 9 Drawing Sheets

(56) References Cited

U.S. PATENT DOCUMENTS

| | | | | |
|---|---|---|---|---|
| 5,641,034 A * | 6/1997 | Calmeise | A47C 12/00 182/17 |
| 5,697,669 A * | 12/1997 | Yemini | A47C 13/00 16/257 |
| 6,158,552 A * | 12/2000 | Gould | A47C 12/02 182/200 |
| 6,338,528 B1 * | 1/2002 | Lohness | A47C 1/124 248/200 |
| 6,378,720 B1 * | 4/2002 | Santa Cruz | B65F 1/062 182/91 |
| 6,432,416 B1 * | 8/2002 | Cummings | A01N 25/10 424/400 |
| 6,446,828 B1 * | 9/2002 | Casteel | A47G 19/065 220/23.83 |
| 6,749,259 B2 * | 6/2004 | Ware | A47C 1/124 297/232 |
| 7,097,241 B2 * | 8/2006 | Tally | A47C 12/00 16/43 |
| 7,111,902 B1 * | 9/2006 | Conner | A47C 1/124 297/248 |
| D540,950 S * | 4/2007 | Johnson | D24/183 |
| D582,168 S * | 12/2008 | Sandel | D6/349 |
| D632,101 S * | 2/2011 | Sandel | D6/349 |
| 8,176,857 B2 * | 5/2012 | Ochs | A47B 87/002 108/64 |
| 8,287,181 B1 * | 10/2012 | Melvin | E04D 15/00 366/348 |
| 8,701,570 B2 * | 4/2014 | Wilson | B65D 19/0016 108/56.1 |
| D787,873 S * | 5/2017 | Rolla | D6/718 |
| 10,154,735 B2 * | 12/2018 | Poveda Rosa | A47C 19/202 |
| 2003/0088914 A1 * | 5/2003 | Vigneron | A47C 19/202 5/8 |
| 2003/0096017 A1 * | 5/2003 | Decker | A01N 41/10 424/617 |
| 2003/0217646 A1 * | 11/2003 | Tingley | A21B 3/132 99/426 |
| 2003/0217889 A1 * | 11/2003 | Sapatova | A47C 12/02 182/33 |
| 2004/0129495 A1 * | 7/2004 | Lamerson | E06C 1/005 182/33 |
| 2005/0166317 A1 * | 8/2005 | Kelly | A47D 13/06 5/110 |
| 2006/0237615 A1 * | 10/2006 | Thomas | F16M 11/22 248/346.01 |
| 2008/0067003 A1 * | 3/2008 | Emge | A47C 12/02 182/222 |
| 2008/0164744 A1 * | 7/2008 | Wang | A47C 7/746 297/452.18 |
| 2010/0043132 A1 * | 2/2010 | Viglietta | A47K 11/06 4/483 |
| 2010/0187041 A1 * | 7/2010 | Crouch | A47C 12/00 182/223 |
| 2011/0037237 A1 * | 2/2011 | Hassell | B65C 21/046 280/79.11 |
| 2011/0065556 A1 * | 3/2011 | Middleton | B29C 45/14336 493/52 |
| 2013/0117936 A1 * | 5/2013 | Stryker | A61G 7/05 5/600 |
| 2013/0220403 A1 * | 8/2013 | Rizzo | F16B 21/125 136/251 |
| 2014/0263363 A1 * | 9/2014 | Sherman | B44D 3/12 220/570 |
| 2015/0359390 A1 * | 12/2015 | Goetz | A47C 3/04 4/611 |
| 2016/0015177 A1 * | 1/2016 | Blake | A47B 7/02 108/64 |
| 2016/0029812 A1 * | 2/2016 | Terhune | A47D 1/006 297/153 |
| 2016/0100693 A1 * | 4/2016 | Urban | A47D 7/00 5/8 |
| 2019/0038036 A1 * | 2/2019 | Squires | F16B 12/44 |
| 2020/0095009 A1 * | 3/2020 | Allers | B65D 43/162 |

* cited by examiner

STEP STOOL WITH ANTI-MICROBIAL PROTECTION

CROSS-REFERENCE TO RELATED APPLICATIONS

The present application claims priority to and benefit from U.S. Provisional Patent Application 62/468,995, filed on Mar. 9, 2017 as well as from Canadian Patent Application 2,960,350, filed on Mar. 9, 2017, the disclosure of both of which is incorporated herein by reference in its entirety.

FIELD OF TECHNOLOGY

The present technology generally relates to a step stool having anti-microbial protection. In particular, the present technology relates to a step stool having an anti-microbial coating.

BACKGROUND INFORMATION

In hospital settings, health care workers often rely on a step stool to reach objects that are otherwise out of their reach and/or to ensure that they are comfortable, efficient and safe while performing certain tasks. This is especially applicable to the medical personal working in operating rooms where the position of the medical staff such as the surgeon often needs to be adjusted according to the operating site or surgical site.

While safety step stools for hospitals are known in the art, such stools are relatively complex in structure and often lack the necessary features of safety and convenience. For example, the step stools available in the art are often unstable and tend to wobble or tip. In addition, the step stools available in the art are often complex in shape and structures and are often made of a plurality of pieces creating crevices, joints and/or seams that are difficult to clean and to disinfect. Fluids and biological materials can reach and accumulate in these spaces and can give rise to contamination and growth of microbial agents.

As such, there remains a need in the art for a step stool which is safe and convenient to use and to store, that is easily cleaned and that prevents accumulation and/or growth of microbial agents.

SUMMARY OF TECHNOLOGY

According to one aspect, the present technology relates to a step stool having an anti-microbial coating, wherein the step stool comprises: a footplate having a size sufficient to support two feet, the footplate being defined by a footplate surface and a perimeter, wherein the perimeter has at least four sides and at least four corners; at least four supporting members extending downwardly from each one of the at least four corners, each one of the at least four supporting members having an upper portion and a lower portion, wherein the lower portion comprises a projection for engaging within a recessed corner portion defined at the at least four corners when a first step stool in placed on top of a second step stool; and an anti-microbial coating applied onto the step stool; wherein the anti-microbial coating prevents microbial growth on to the step stool.

According to one aspect, the present technology relates to a step stool as defined herein, wherein the step stool has a surface and the anti-microbial coating is applied on the entire surface.

According to one aspect, the present technology relates to a step stool as defined herein, wherein the step stool is stackable with another step stool.

According to one aspect, the present technology relates to a step stool as defined herein, wherein the recessed corner portion forms a shoulder at the corner.

According to one aspect, the present technology relates to a step stool as defined herein, wherein the shoulder is on the perimeter of the footplate.

According to one aspect, the present technology relates to a step stool as defined herein, wherein the recessed corner portion has a surface that is substantially flat to avoid retention of fluids in the recessed corner portions.

According to one aspect, the present technology relates to a step stool as defined herein, wherein the recessed corner portion has a size and a shape and the projection has a size and a shape that are complementary to the size and the shape of the recessed corner portion so that the projection securely engages with the recessed corner portion.

According to one aspect, the present technology relates to a step stool as defined herein, wherein the step stool is connectable to another step stool to form a platform.

According to one aspect, the present technology relates to a step stool as defined herein, wherein the at least four sides extend downwardly to form an arch between two of the supporting members.

According to one aspect, the present technology relates to a step stool as defined herein, wherein the arches comprise the means for attaching the step tool to another step stool.

According to one aspect, the present technology relates to a step stool as defined herein, wherein the attachment means comprise holes and pins.

According to one aspect, the present technology relates to a step stool as defined herein, wherein the attachment means comprise tongues and grooves.

According to one aspect, the present technology relates to a step stool as defined herein, being made of a single piece of material.

According to one aspect, the present technology relates to a step stool as defined herein, wherein the material is a metallic material.

According to one aspect, the present technology relates to a step stool as defined herein, wherein the metallic material is aluminium.

According to one aspect, the present technology relates to a step stool as defined herein, wherein the metallic material is steel.

According to one aspect, the present technology relates to a step stool as defined herein, wherein the steel is stainless steel.

According to one aspect, the present technology relates to a step stool as defined herein, wherein the footplate surface comprises a recessed footplate portion.

According to one aspect, the present technology relates to a step stool as defined herein, wherein the recessed footplate portion is suitable for accepting a mat.

According to one aspect, the present technology relates to a step stool as defined herein, wherein the mat diminishes slipperiness of the surface of the footplate.

According to one aspect, the present technology relates to a step stool as defined herein, wherein the anti-microbial coating is an anti-microbial powder coating comprising an anti-microbial agent.

According to one aspect, the present technology relates to a step stool as defined herein, wherein the anti-microbial coating is an anti-microbial paint comprising an anti-microbial agent.

According to one aspect, the present technology relates to a step stool as defined herein, wherein the anti-microbial agent comprises a silver ion-containing compound.

According to one aspect, the present technology relates to a step stool as defined herein, wherein the silver ion-containing compound is in the form of a silver ion carried by a zeolite.

According to one aspect, the present technology relates to a step stool as defined herein, wherein the silver ion-containing compound is supplied by a silver salt.

According to one aspect, the present technology relates to a step stool as defined herein, wherein the silver ion-containing compound is supplied by an organic compound containing silver.

According to one aspect, the present technology relates to a step stool as defined herein, wherein the anti-microbial powder comprises a thermosetting composition based on a cured polyester resin composition.

BRIEF DESCRIPTION OF THE FIGURES

FIG. 8A shows one step stool comprising holes for engaging with the pins of another step stool which is shown in FIG. 8B.

DESCRIPTION OF TECHNOLOGY

The present technology relates to a step stool having anti-microbial protection. In some instances, the step stool described herein is useful in hospital settings; in particular, the step stool disclosed herein is useful in operating rooms for bringing a work surface to a height that is suitable for the user.

In some embodiments, the step stools disclosed herein may be stackable (e.g., the step stools being placed one on top of another) for increased height. The step stools disclosed herein may also be positioned side-by-side (e.g., the step stools being placed one next to another) to create a larger standing platform.

In some embodiments, the anti-microbial protection of the step stool helps preventing accumulation and/or growth of microbial agents, which may be present in hospital setting, on the step stool.

Figure 1:
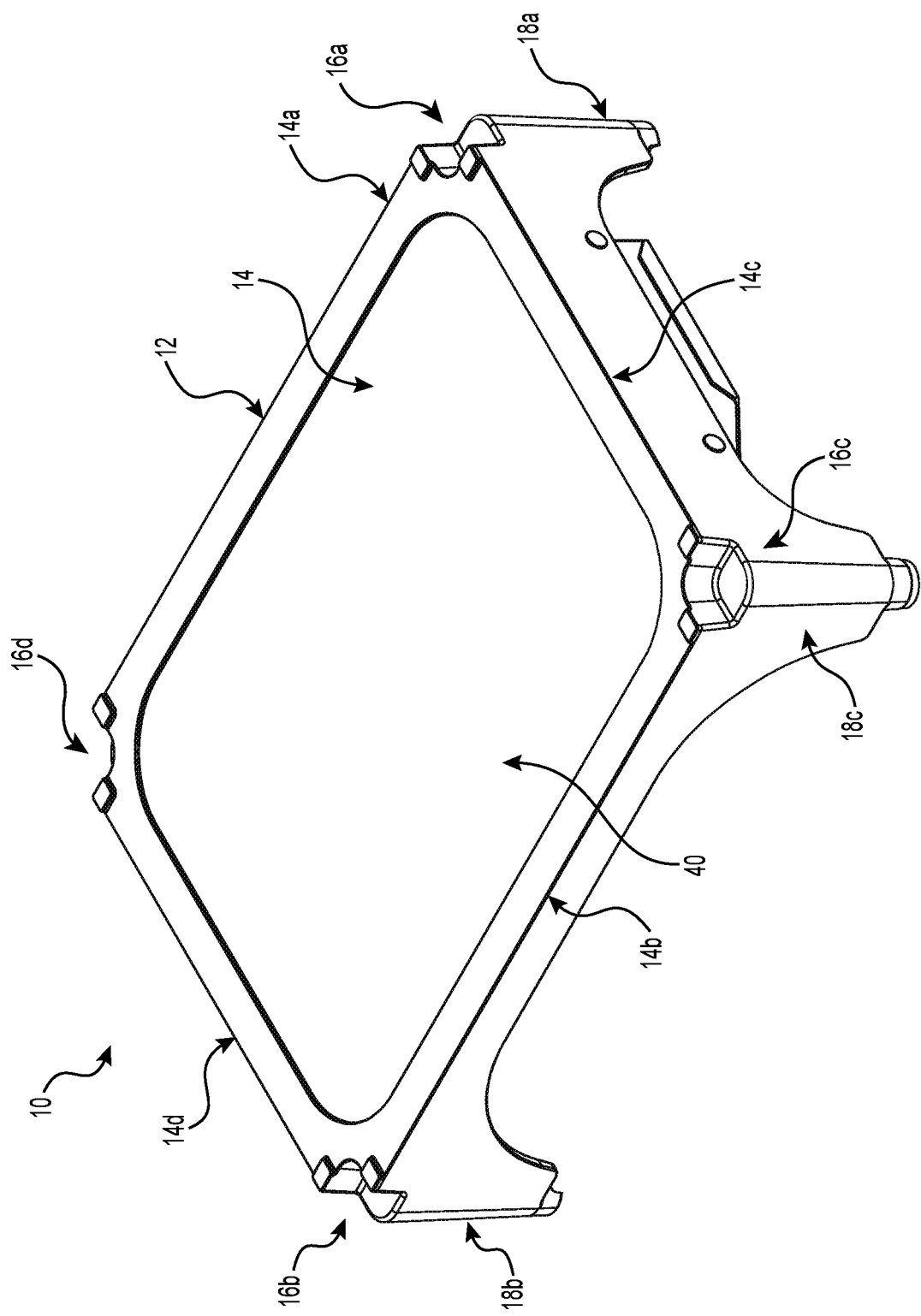
FIGS. 1, 3 and 6 show an elevated side view of a step stool according to one embodiment of the present disclosure.

FIG. 1 depicts an embodiment of the step stool (10) of the present technology. In this embodiment, the step stool (10) comprises a footplate (12) having a size sufficient to support the feet of a user (e.g., an adult user). In this embodiment, the footplate (12) has a rectangular shape comprising a foot contacting surface (14) delimited by a perimeter. The footplate has four sides ($14_a$, $14_b$, $14_c$, $14_d$), wherein sides $14_a$ and $14_b$ are of a substantially identical length and sides $14_c$ and $14_d$ are of a substantially identical length which is different than the length of sides $14_a$, $14_b$. In this embodiment, the length of sides $14_a$, $14_b$ is longer than the length of sides $14_c$, $14_d$ to create the rectangular shape of the footplate (12). It will be understood that the footplate (12) may also have other shapes (e.g., square) without departing from the present technology. The footplate (12) also comprises four corners ($16_a$, $16_b$, $16_c$, $16_d$) located at the intersection of two sides ($14_a$, $14_b$, $14_c$, $14_d$).

Figure 2:
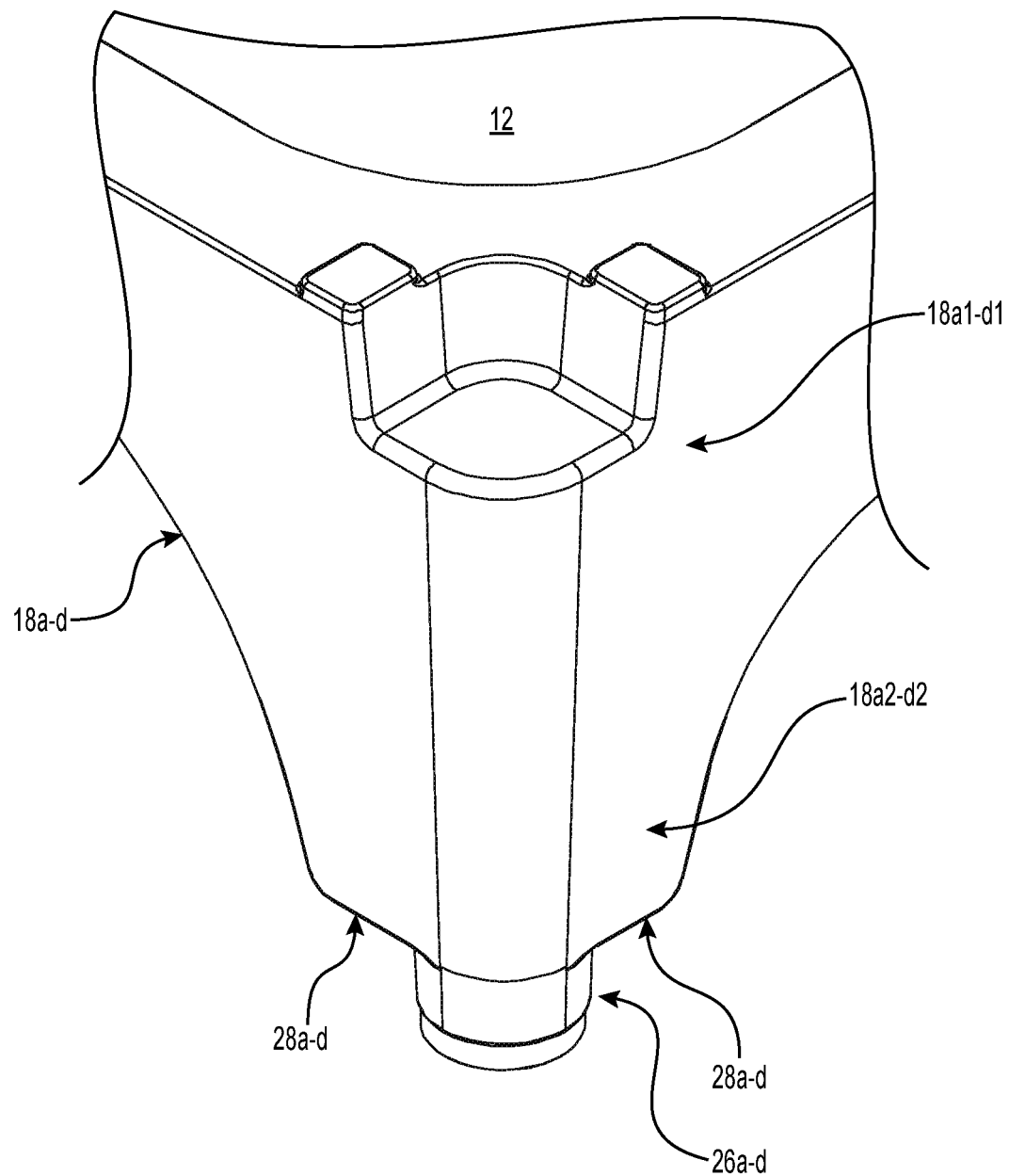
FIGS. 2 and 4 show a side view of a supporting member of a step stool according to one embodiment of the present disclosure.

The foot stool (10) comprises four supporting members ($18_a$, $18_b$, $18_c$, $18_{d\ (not\ shown)}$) extending downwardly from each one of the corners ($16_a$, $16_b$, $16_c$, $16_d$). FIG. 2 shows that each of the supporting members ($18_a$, $18_b$, $18_c$, $18_d$) having a upper portion ($18_{a1}$, $18_{b1}$, $18_{c1}$, $18_{d1}$) and a lower portion ($18_{a2}$, $18_{b2}$, $18_{c2}$, $18_{d2}$) responsible for contacting the floor or for contacting another foot stool. In this embodiment, the supporting members ($18_a$, $18_b$, $18_c$, $18_d$).

The upper portions ($18_{a1}$, $18_{b1}$, $18_{c1}$, $18_{d1}$) of the supporting members ($18_a$, $18_b$, $18_c$, $18_{d1}$) corresponding with the corners ($16_a$, $16_b$, $16_c$, $16_d$) of the footplate (12).

Figure 3:
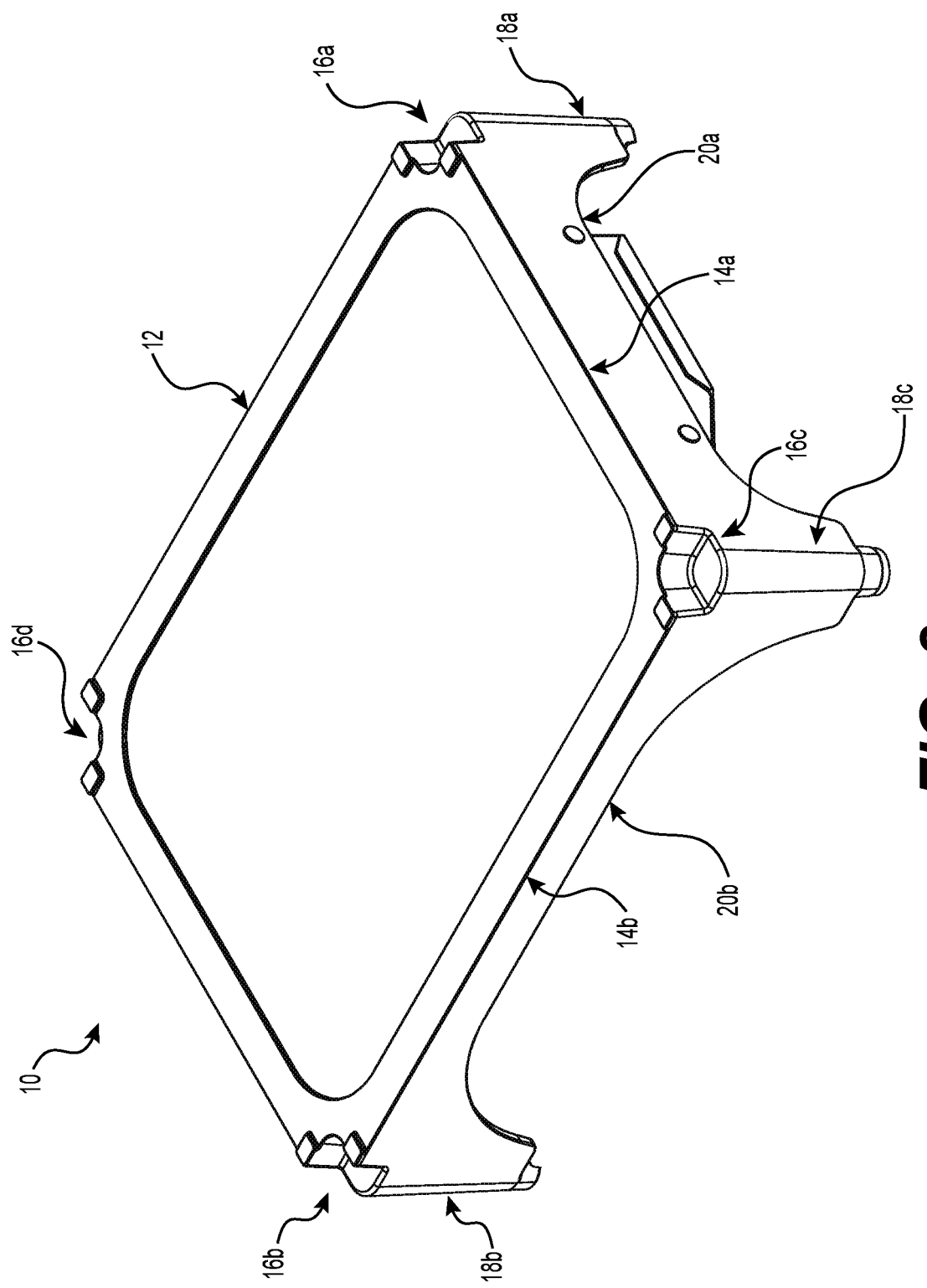

As depicted in FIG. 3, the four sides ($14_a$, $14_b$, $14_c$, $14_d$) of the foot contacting surface (14) extend downwardly to form an arch ($20_a$, $20_b$, $20_{c\ (not\ shown)}$, $20_{d\ (not\ shown)}$) between two of the supporting members ($18_a$, $18_b$, $18_c$, $18_{d\ (not\ shown)}$). In some instances, the arches provide strength and stability to the foot stool. It will be understood that the four sides ($14_a$, $14_b$, $14_c$, $14_d$) of the foot contacting surface (14) may extend downwardly to form other shapes and/or structure than an arch without departing from the present technology.

Figure 4:
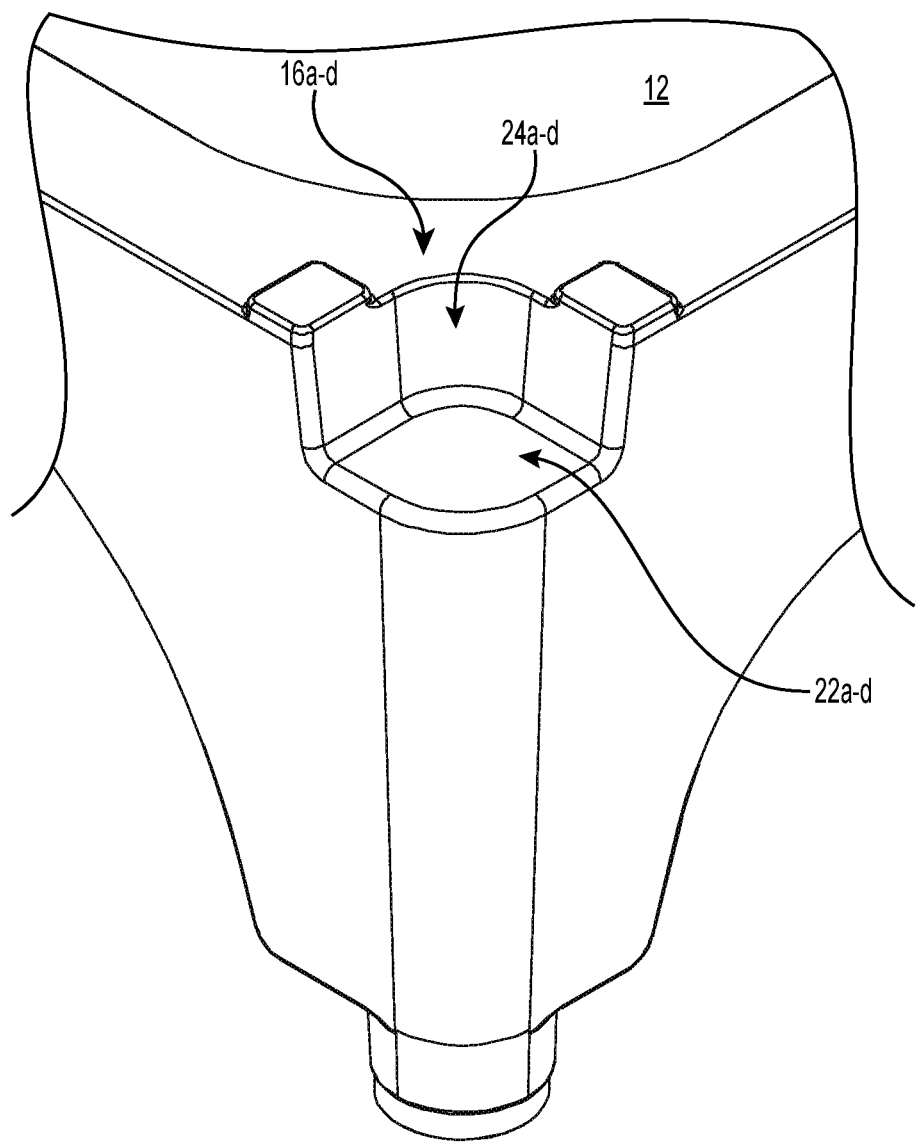

As depicted in FIG. 4, each one of the corners ($16_a$, $16_b$, $16_c$, $16_d$) comprises a recessed corner portion ($22_a$, $22_b$, $22_c$, $22_d$) that forms a wall ($24_a$, $24_b$, $24_c$, $24_d$) on the external perimeter of the footplate (12).

Figure 5:
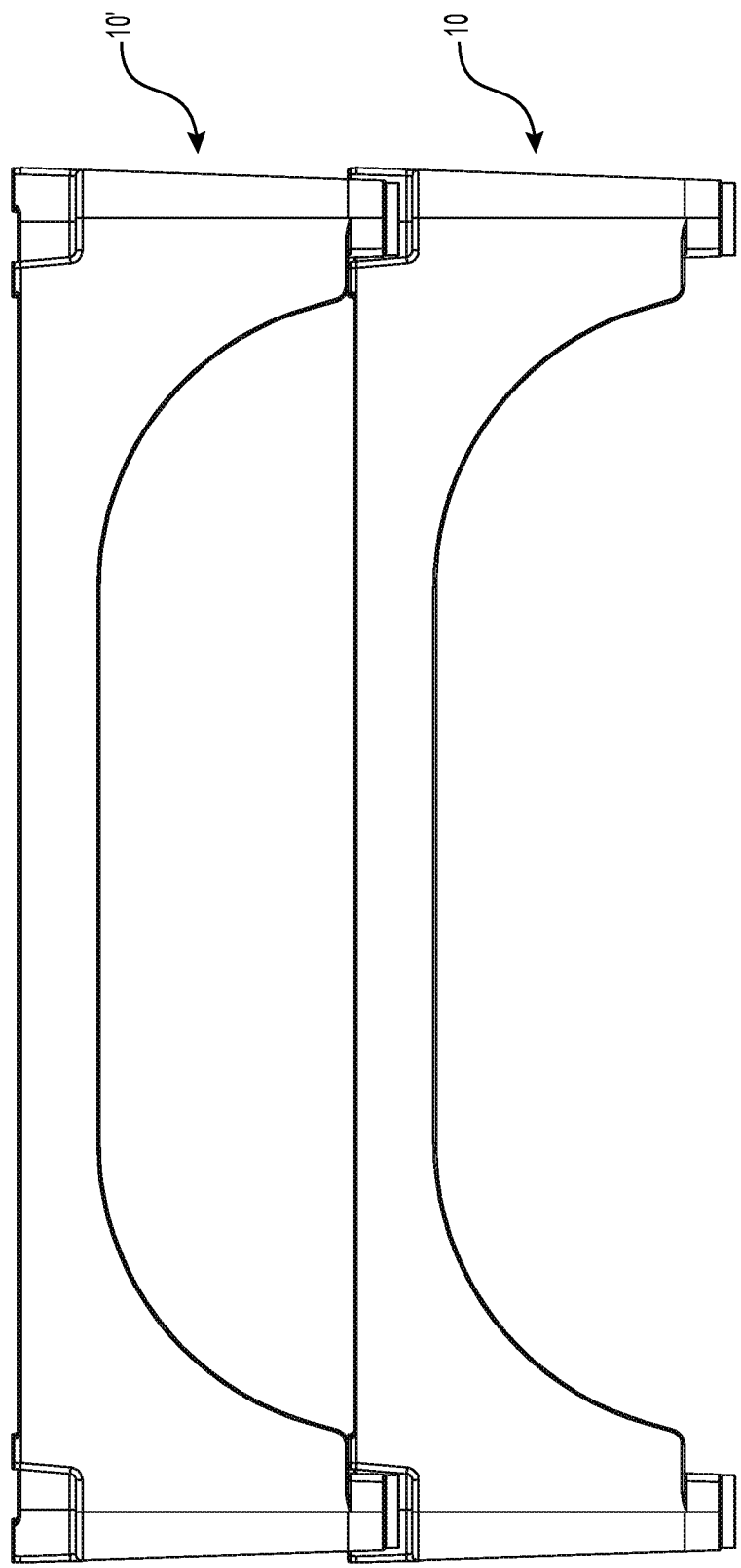
FIG. 5 shows an elevated side view of two step stools according to one embodiment of the present disclosure that are placed one on top of another.

As depicted in FIG. 2, the lower portions ($18_{a1}$, $18_{b1}$, $18_{c1}$, $18_{d1}$) of supporting members ($18_a$, $18_b$, $18_c$, $18_d$) each comprises a projection ($26_a$, $26_b$, $26_c$, $26_d$). The projections ($26_a$, $26_b$, $26_c$, $26_d$) form a shoulder ($28_a$, $28_b$, $28_c$, $28_d$) with the of the lower portions of the arches ($20_a$, $20_b$, $20_c$, $20_d$). The shoulders ($28_a$, $28_b$, $28_c$, $28_d$) have a shape that is complementary to the walls ($24_a$, $24_b$, $24_c$, $24_d$), thereby causing engagement with the recessed corner portions ($22_a$, $22_b$, $22_c$, $22_d$) when a first step stool in placed on top of a second step stool such as depicted in FIG. 5.

In this embodiment the projections ($26_a$, $26_b$, $26_c$, $26_d$) are of circular shape to ensure lodging into the recessed corner portions ($22_a$, $22_b$, $22_c$, $22_d$). In other instances, the projections ($26_a$, $26_b$, $26_c$, $26_d$) have a different shape. It is top be understood that the shape of the projections ($26_a$, $26_b$, $26_c$, $26_d$) should be substantially complementary to the shape of recessed corner portions ($22_a$, $22_b$, $22_c$, $22_d$) to ensure stable abutment and therefore secure engagement between the surface of the projections ($26_a$, $26_b$, $26_c$, $26_d$) and the surface of the recessed corner portions ($22_a$, $22_b$, $22_c$, $22_d$) for stability of the foot stools placed one on top of another.

In some implementations of this embodiment, the surface of the recessed corner portions ($22_a$, $22_b$, $22_c$, $22_d$) is substantially flat to avoid retention of any fluids or solid materials in the recessed corner portions ($22_a$, $22_b$, $22_c$, $22_d$). The configuration to the recessed corner portions ($22_a$, $22_b$, $22_c$, $22_d$) as depicted in FIG. 4 allows for fluids or solid materials in contact with the surface of the recessed corner portions ($22_a$, $22_b$, $22_c$, $22_d$) to be easily removed and/or washed away upon cleaning of the foot stool (10). This feature of the foot stool (10) decreases the chance of biological contamination of the foot stool (10). Likewise, the surface of the projections ($26_a$, $26_b$, $26_c$, $26_d$) is preferentially continuous, that is to say that it is without crevices, cracks, joints or the like that could potentially entrap fluids and biological contaminants.

Figure 6:
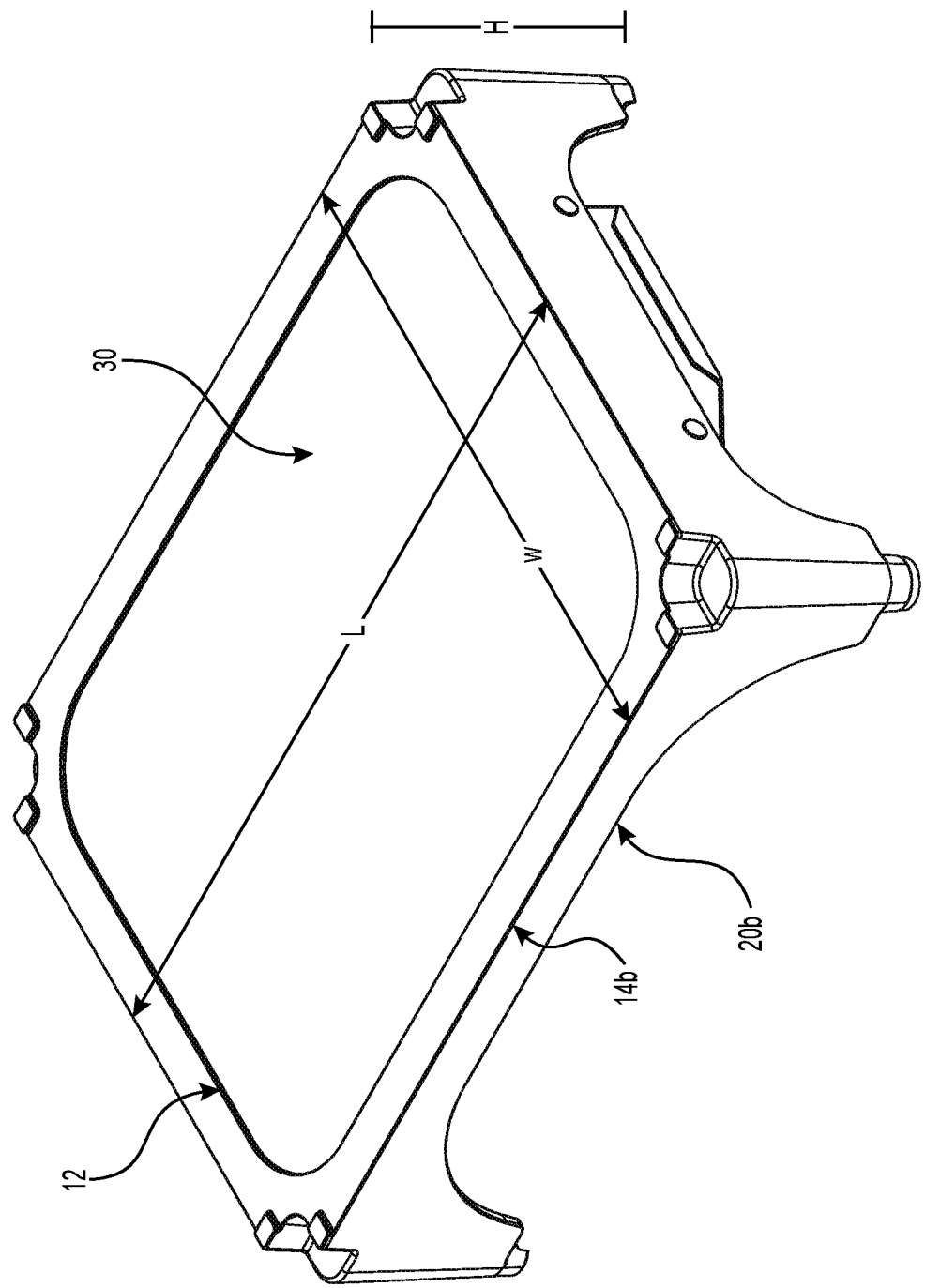
Figure 8A:
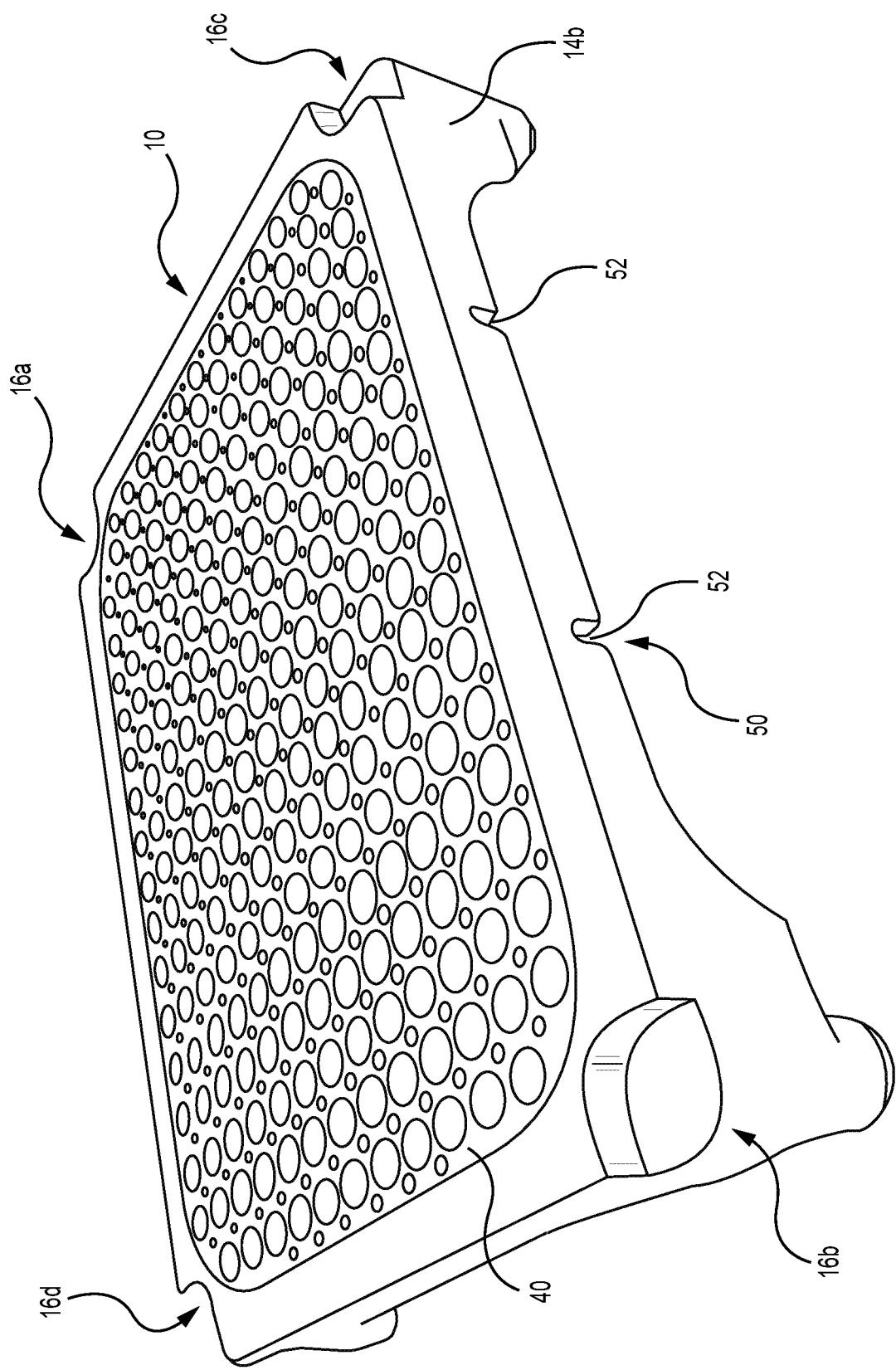
FIGS. 8A and 8B show an elevated side view of step stool according to one embodiment of the present disclosure, wherein the step stool comprises an attachment means between two step stools to create the platform as depicted in FIG. 7.

In some embodiments as depicted in FIG. 6, the surface of the footplate (12) comprises a recessed footplate portion (30) for placement of a mat (40) as shown in FIG. 1. The mat (40) is retained into the recessed footplate portion (30) due to its shape that is complementary to the recessed footplate portion (30), preferably both in terms of dimensions and thickness. The mat (40) diminishes slipperiness of the surface of the footplate (12). The mat (40) may be made of any material that allows any fluids to flow freely off the mat (40), thereby decreasing the risk of the user slipping when stepping onto or stepping off the step stool 14. For example, the mat (40) may be made of any rubber or any plastic materials that are preferentially water resistant. In some further instances, the mat (40) is made of neoprene, polyvinyl chloride (pvc), polyethylene, polypropylene, silicone or any combinations thereof. The mat (40) is also removable from the recessed footplate portion (30) to allow one or more of cleaning of the mat (40) separately from the foot stool (10), cleaning of the recessed footplate portion (30) or replacement of a used mat with a new unused mat. In some instances, the mat (40) may be substantially flat (without textured) or may be textured. The presence of texture on the mat may enhance security of the user or may provide anti-fatigue properties to the step stool. For example, the mat may comprise strips or geometric shapes such as circles as depicted in FIG. 8A.

In some implementations as shown in FIG. 6, the step stool (10) has a length (L) that is at least about 30 cm, at least about 35 cm, at least about 40 cm, at least about 41 cm, at least about 42 cm, at least about 43 cm, at least about 44 cm, at least about 44 cm, at least about 45 cm, or at least about 50 cm.

In some implementations as shown in FIG. 6, the step stool (10) has a width (W) that is at least about 25 cm, at least about 26 cm, at least about 27 cm, at least about 28 cm, at least about 29 cm, at least about 30 cm, at least about 31 cm, at least about 32 cm, at least about 33 cm, at least about 34 cm, or at least about 35 cm.

In some implementations as shown in FIG. 6, the step stool (10) has a height (H) that is at least about 7 cm, at least about 8 cm, at least about 9 cm, at least about 10 cm, at least about 12 cm, at least about 13 cm, at least about 14 cm, at least about 15 cm, at least about 20 cm, or at least about 25 cm.

In some implementations of these embodiments, the step stool (10) has a length (L) of at least 43 cm, a width (W) of at least 33 cm and a height (H) of at least 11 cm.

In one embodiment, the step stool (10) is made out of one piece of material. That is to say that there are no seams, crevices, joints or connections or the like between the different parts of the step stool (10) (e.g., between the footplate (12) and the supporting members ($18_a$, $18_b$, $18_c$, $18_d$)). In some instances, the step stool (10) is made by moulding. In some instances, the step stool (10) is made by casting.

In some embodiments, the step stool (10) is composed of metal materials. In some instances, the metal materials are one or more of steel, stainless steel, aluminium, and titanium.

In some instances, the step stool (10) is made of a metal alloy.

In some other instances, the step stool (10) is made of aluminium. In some other instances, the step stool (10) is made of cast aluminium. The techniques for casting aluminium are well known in the art.

In some other embodiments, the step stool (10) is made of polymer materials (e.g., organic or synthetic polymers).

Figure 7:
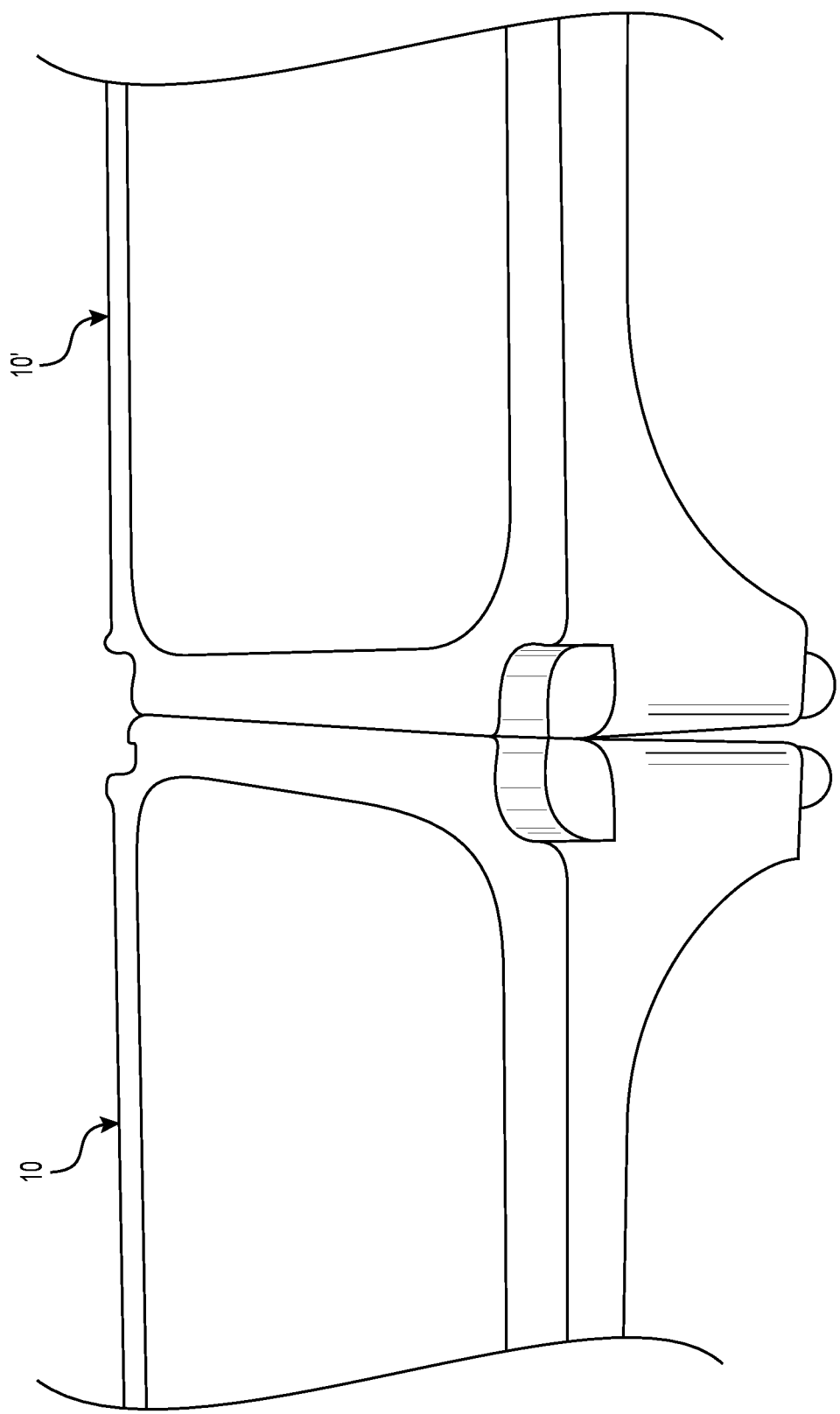
FIG. 7 shows an elevated side view of two step stools according to one embodiment of the present disclosure that are placed side by side.

According to other embodiments, the step stool (10) may be attached to another step stool (10') to form a custom sized platform as illustrated in FIG. 7. In this embodiment, the sides ($14_a$, $14_b$, $14_c$, $14_d$) of the foot contacting surface (14) comprise attachment means (50) (also referred herein as "means for attachment") for attaching two step stools together.

Figure 8B:
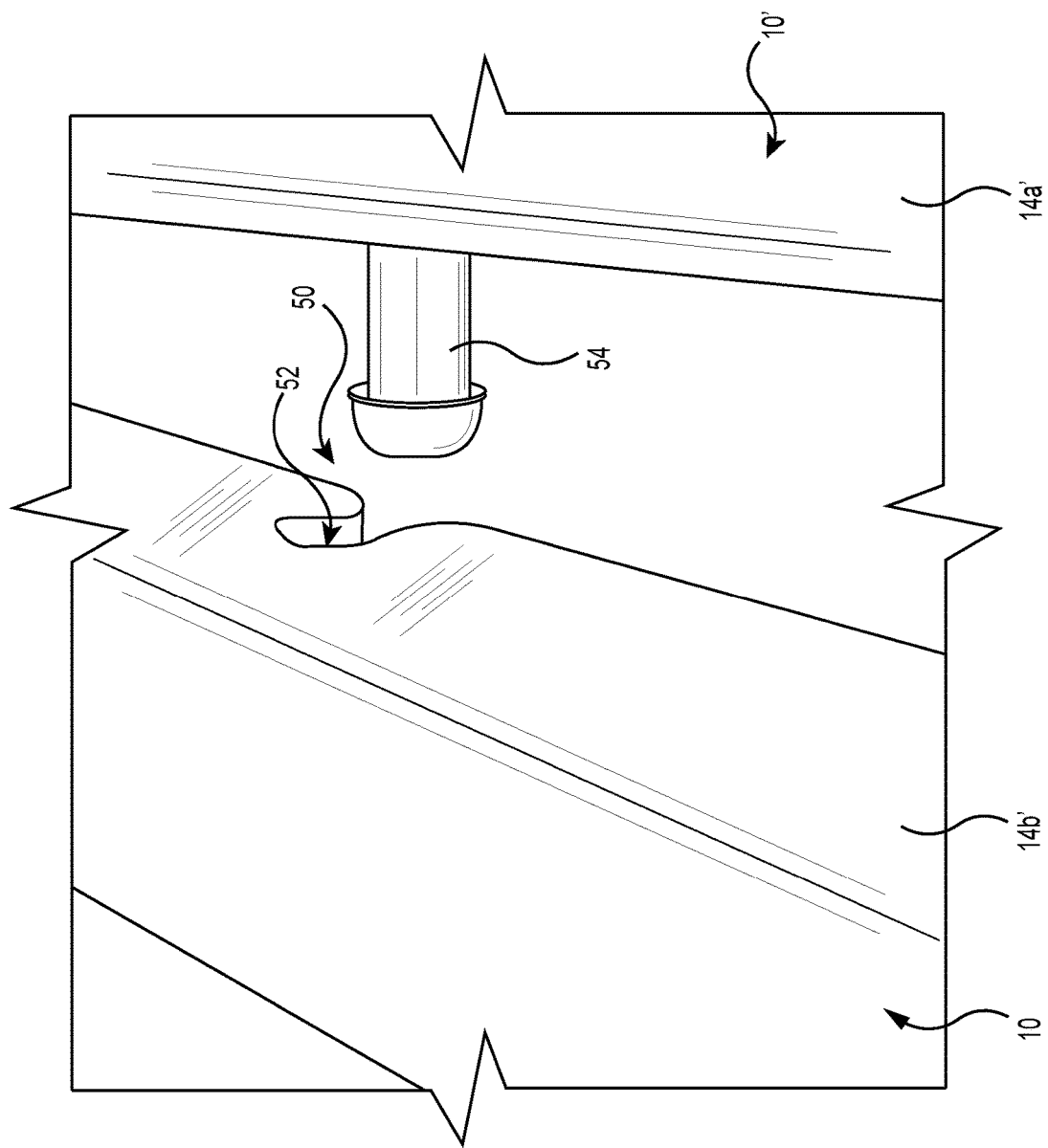

FIGS. 8A and 8B show the attachment means (50) which are composed of holes (52) located on at least two sides of the step stool (10) and pins (54) located on at least two sides of the step stool (10). In this embodiment, there are two holes on one side of the step stool (10) and two pins on another side of the step stool to allow attachment of step stools on every side of the step stool. The pins (54) have a size and shape that is complementary to the size and shape of the holes (52) to ensure engaging and interlocking of the step stools. The holes (52) and the pins (54) are aligned on the step stool to ensure registration of the corners ($16_a$, $16_b$, $16_c$, $16_d$) of the footplate (12) of one step stool (10) with the corners ($16_a'$, $16_b'$, $16_c'$, $16_d'$) of the footplate (12') of another step stool (10').

Other attachment means may also be used to connect the step stools together such as for example, tongues and grooves, hooks-and-eyes or the like.

In one embodiment, the step stool (10) of the present disclosure comprises an anti-microbial coating. The anti-microbial coating helps to prevent and/or inhibit growth of microbial agents (such as, for example, mold, bacteria, yeast) or helps to kill microbial agents or both.

In some embodiments, the anti-microbial coating of the present disclosure is a silver-based coating, wherein the anti-microbial coating comprises at least one silver ion-containing compound. A step stool coated with the silver-based coating has an amount of surface-available silver ions.

In some implementations of this embodiment, the anti-microbial coating is in the form of a powder that comprises the silver ion-containing compound and that is coated or applied to the surface of the step stool (10).

Silver ions have widespread effect as an anti-microbial agent. For example, silver ions may be effective against bacteria such as *Escherichia coli* and *Salmonella typhimurium*, and mold such as *Asperigillus niger*.

Without being bound by theory, silver ions are believed to bind to cell surface to disrupt the cell wall and to prevent cell growth. The silver ions are believed to be attracted to the thiol groups in the cell enzymes, thereby preventing the microbial agent such as bacteria from producing energy. Silver ions are also believed to interfere with DNA replication and new cell formation.

Sources of silver ions for anti-microbial use include metallic silver, silver salts and organic compounds that contain silver. Silver salts may include for example: silver carbonate, silver sulfate, silver nitrate, silver acetate, silver benzoate, silver chloride, silver fluoride, silver iodate, silver iodide, silver lactate, silver nitrate, silver oxide and silver phosphates. Organic compounds containing silver may include for example, silver acetylacetonate, silver neodecanoate and silver ethylenediaminetetraacetate in all its various salts.

Silver containing zeolites are of particular use. Zeolites are useful because when carried in a polymer matrix they may provide silver ions at a rate and concentration that is effective at killing and inhibiting microorganisms without harming higher organisms.

Powder coating of the present disclosure may be sprayed electrostatically onto a metal or nonmetal substrate. Charged particles of the powder coating are sprayed onto the substrate until a desired thickness is achieved. Other methods, such as fluidized bed coating methods, thermal spraying and flame spraying may also be used.

After deposition of the powder coating is complete, the coated substrate is heated. For example, an electrical or gas fired oven may be used to cure or fuse the coating at temperatures in the range of between about 80° C. and about 270° C. The curing time may be about five to twenty minutes for most substrates, but may vary from less than a minute to greater than one hour depending on the type of coating, the substrate, and the curing system. In addition to thermal methods, curing may also be achieved by electron beam or photochemical methods such as ultraviolet, infrared and the like.

The powder coatings of the present disclosure may be made by a melt extrusion method. For example, a powder formulation including for example, fillers, extenders, flow additives, catalysts, hardeners, catalysts, pigments and other additives may be blended together with the resin and the anti-microbial agent in a premixer. The mixture may then be fed into an extruder and heated to a temperature high enough to melt and mix the constituents. A temperature in the range of between about 50° C. and about 150° C. may be sufficient. The molten extrudate may be immediately cooled by chill rolls to form solid sheets. The resulting solid sheets may be broken down to suitably sized chips. These chips may then fed into a grinder to reduce the chips to fine particles having a mean particle size of, for example, between about 10 microns and about 180 microns.

The silver ion-containing compound may be premixed directly with the formulation components. Alternatively, the particles of silver ion-containing compound may be bonded with pre-formed powder coating particles using impact fusion. This process is also known in the art as "fusion bonding", with either method, mixing the anti-microbial particles with coating particles of the same particle size distribution is not necessary.

Liquid silver ion-containing compound may be mixed readily with other components in the premix prior to extrusion. Alternatively, liquid silver ion-containing compound may be mixed initially with particles of a solid support material such as silica, clay or other resins in a masterbatch. The dry mixture containing the silver ion-containing compound may then be mixed into a formulation of resin.

Liquid and solid silver ion-containing compounds also may be incorporated within the powder coating particle by dissolving or mixing them and the other powder coating formulation components in a suitable solvent, e.g., organic liquids or supercritical fluids, and then removing the liquid in such a manner as to yield a powder or a solid product which can be processed into a powder.

In some other embodiments, the anti-microbial coating is a paint that comprises the silver ion-containing compound. The paint comprising the silver ion-containing compound is coated onto or applied to the surface of the step stool. In such implementations, the silver ion-containing compound may be in the form of a powder or a liquid which is mixed to the paint to be applied onto the surface of the step stool according to methods known in the art. The paint may be any one of water based emulsion paint, vinyl paint, latex paint, acrylic gloss or vanish.

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those skilled in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those skilled in the art and are within the scope of the invention, which is defined by the appended claims.

All documents referred to herein are incorporated by reference.

The invention claimed is:

1. A step stool comprising:
    a) a footplate having a size sufficient to support two feet, the footplate being defined by a footplate surface and a perimeter, wherein the perimeter has at least four sides and at least four corners, each one of the at least four corners having a recessed corner portion;
    b) at least four supporting members, a respective one of the at least four supporting members extending downwardly from a respective corner of the at least four corners, and having an upper portion and a lower portion, wherein the lower portion comprises a projection for engaging within a recessed corner portion of an other step stool when the step stool is placed on top of the other step stool; and
    c) an anti-microbial coating applied onto the step stool; wherein the anti-microbial coating prevents microbial growth onto the step stool; and
    wherein the step stool is made of a single piece of material, the single piece of material comprising aluminum, without seams or crevices between the footplate and the at least four support members.

2. The step stool as defined in claim 1, wherein the anti-microbial coating is applied to the footplate and the at least four supporting members of the given step stool-.

3. The step stool as defined in claim 1, wherein the given step stool is stackable with the other step stool.

4. The step stool as defined in claim 1, wherein the recessed corner portion of the other step stool has a size and a shape that is complementary to a size and shape of the projection of the given step stool so that the projection of the given step stool securely engages with the recessed corner portion of the other step stool.

5. The step stool as defined in claim 1, wherein the given step stool is connectable to the other step stool to form a platform.

6. The step stool as defined in claim 1, wherein the at least four sides extend downwardly to form an arch between a given two supporting members of the at least four supporting members.

7. The step stool as defined in claim 6, wherein the arch comprises attachment means for attaching the given step stool to the other step stool.

8. The step stool as defined in claim 7, wherein the attachment means comprise holes and pins or tongues and grooves.

9. The step stool as defined in claim 6, further comprising a shoulder extending from a given projection of one of the two given supporting members to a lower portion of the arch.

10. The step stool as defined in claim 1, wherein the footplate surface comprises a recessed footplate portion.

11. The step stool as defined in claim 10, wherein the recessed footplate portion is suitable for accepting a mat.

12. The step stool as defined in claim 1, wherein the anti-microbial coating is an anti-microbial powder coating comprising an anti-microbial agent.

13. The step stool as defined in claim 12, wherein the anti-microbial powder comprises a thermosetting composition based on a cured polyester resin composition.

14. The step stool as defined in claim 1, wherein the anti-microbial coating is an anti-microbial paint comprising an anti-microbial agent.

15. The step stool as defined in claim 1, wherein the recessed corner portion of the step stool has a size and a shape that is complementary to a size and shape of a projection of the other step stool so that the recessed corner portion of the step stool is configured to securely engage the projection of the other step stool when the other step stool is stacked on top of the step stool.

* * * * *